Figure 1:
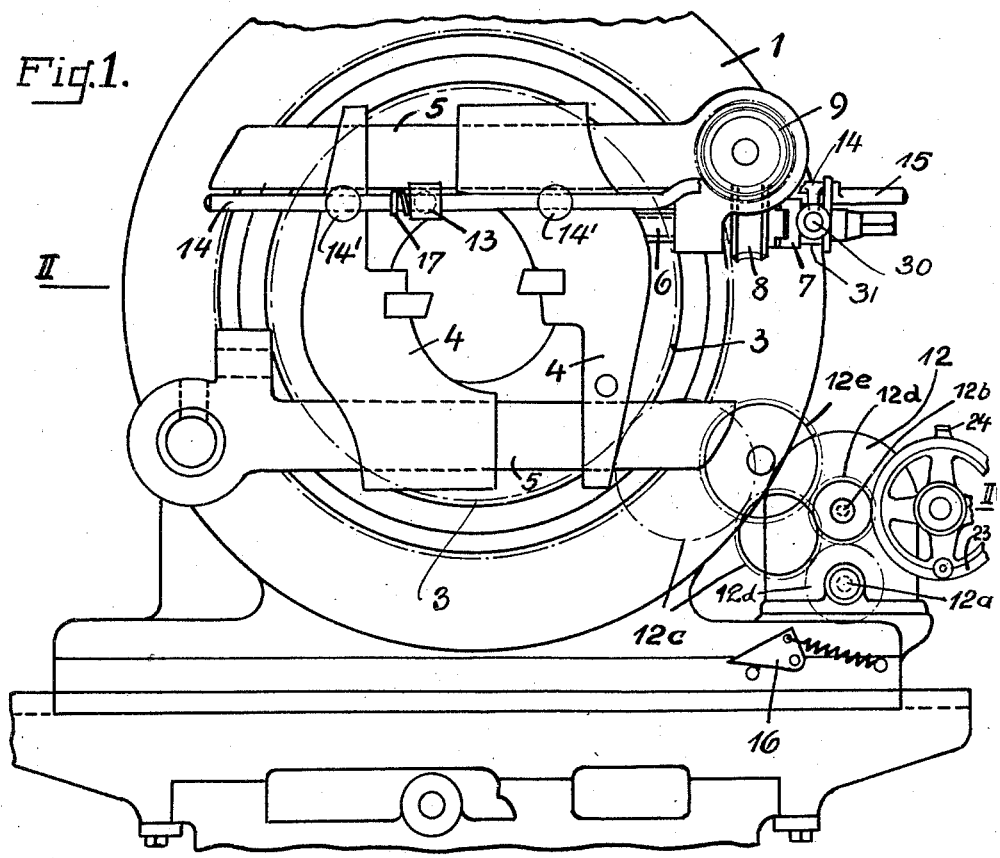

May 21, 1929.   A. DORIN   1,713,892

TOOL MOVING DEVICE FOR CRANK LATHES

Filed Dec. 11, 1925   2 Sheets-Sheet 1

Inventor
Anatol Dorin
By B. Singer, Atty.

Patented May 21, 1929.

1,713,892

UNITED STATES PATENT OFFICE.

ANATOL DORIN, OF BERLIN-CHARLOTTENBURG, GERMANY.

TOOL-MOVING DEVICE FOR CRANK LATHES.

Application filed December 11, 1925, Serial No. 74,847, and in Germany December 11, 1924.

In lathes for machining the cranks of crank shafts it is known to use an auxiliary ring, rotatable on the turning ring, and driven stepwise with greater or smaller velocity than the latter so as to move the tools crosswise on the turning ring. In horizontal drilling and cutting machines it is known to provide coaxial toothed wheels, coupled by a speed changing gear so as to be driven with different velocities and to move the tools crosswise, according to their difference of velocities.

One object of the invention is to provide a crank shaft lathe equipped with a turning ring and an auxiliary ring of such dimensions, that the work piece can be passed through them. These rings are preferably connected by a speed changing gear arranged on the machine frame. Further a gear may be provided for moving the tools by hand, especially in the arrangement as a planetary gear. This new gear gives the possibility to move the tools crosswise during the whole rotation circle of the turning ring, and therefore to cut heavy chips without overloading the tool, as is the case in other lathes, in which only a short cross movement of the tool is possible in every rotation of the turning ring.

The invention further concerns details of the turning and auxiliary rings and the tool moving gear as later described.

The invention is shown in the drawing, in which

Figure 2:
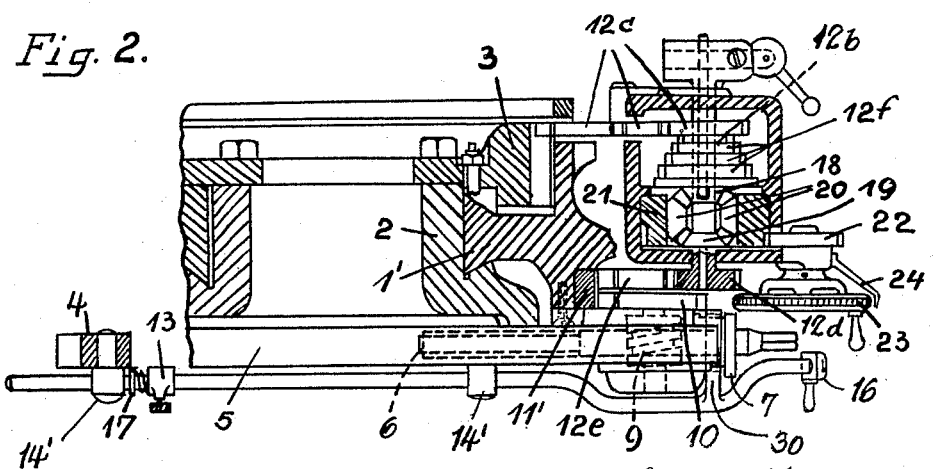
Figure 3:
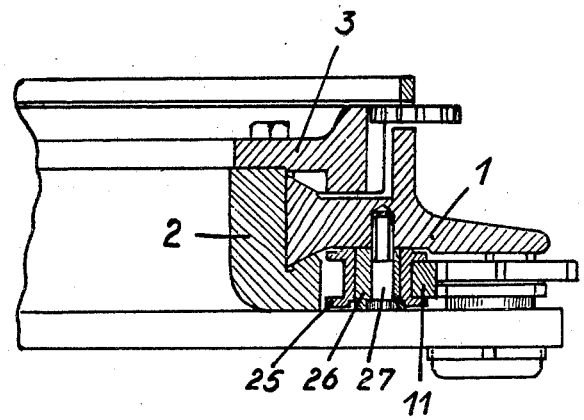
Figure 4:
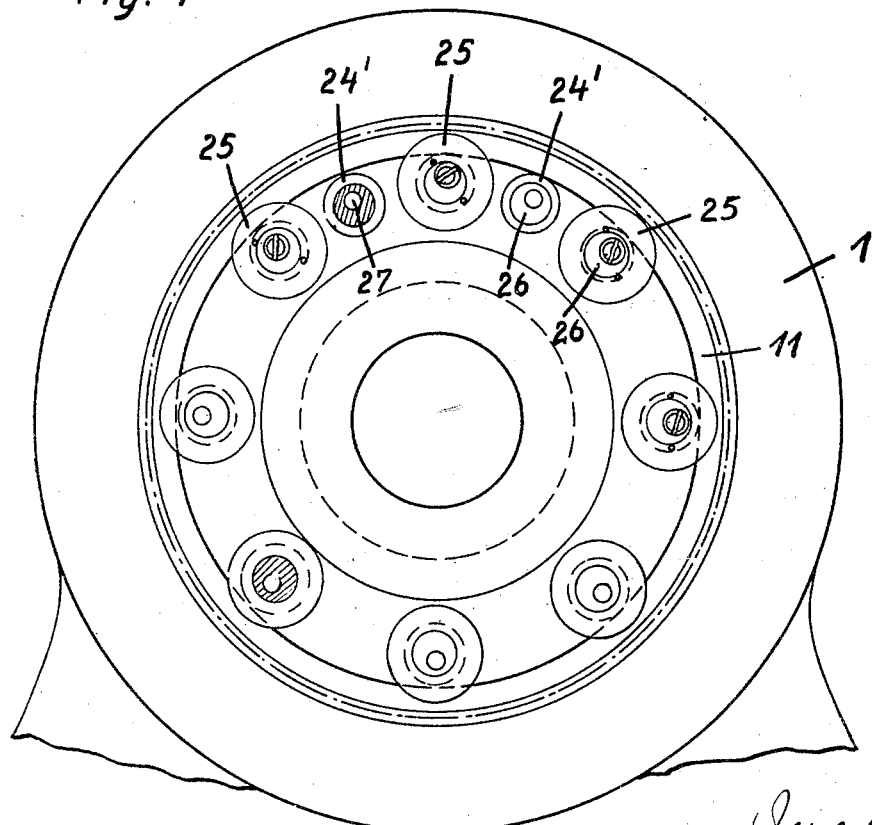

Fig. 1 is a front view of a crank shaft lathe,
Fig. 2 is a partial section, taken on line II—II of Fig. 1,
Fig. 3 is a cross section of a modified constructional form of the auxiliary ring,
Fig. 4 a view, partly in section, of the machine according to Fig. 3.

In an annular machine frame 1 a turning ring 2 is rotatably supported on a bearing surface 1' and is provided with a driving toothed rim 3 for producing the movement of the tools fastened on the ring 2. The ring 2 is driven by a motor driven gear (not shown) engaging its toothed rim 3. Cutting tools are fastened in toolholders or supports 4, 4' which are slidably mounted on guides 5 attached to the lateral face of the turning ring 2 and thus are adapted to be moved crosswise, for which purpose screw spindles 6 are provided. These spindles 6 by jaws or frictional clutches 7 are coupled to worm wheels 8, which are driven by worms 9 and gears 10.

While each tool holder or support is provided with such tool moving gear comprising said elements 6, 7, 8, 9 and 10, only that of the one support 4 is shown in the drawings for sake of simplicity. To drive the worms 9 mounted on the turning ring about their own axes, each worm is connected with a gear 10 which is in engagement with a rotatable auxiliary ring 11 toothed on its outer circumference and placed coaxially to the turning ring 2, 3 on a bearing surface 11' of the machine frame 1. The auxiliary ring 11 is in engagement with a driving mechanism capable of being driven with variable speeds. This mechanism preferably comprises a speed changing gear 12, connecting the auxiliary ring 11 with the turning ring 2. It contains a primary shaft $12^a$ and a secondary shaft $12^b$. The latter carries a plurality of gears $12^f$ of different sizes each of which is in engagement with a corresponding gear (not shown) keyed to the primary shaft $12^a$. Any one of the gears $12^f$ may be coupled with the shaft $12^b$ as desired by a suitable mechanism well known in the art. The primary shaft $12^a$ is driven by a train of gears $12^c$ from the toothed rim 3 and a gear $12^d$ (Fig. 1) mounted upon the primary shaft $12^a$. The secondary shaft $12^b$ is in driving connection with an additional gear $12^e$ which meshes with the auxiliary ring 11 whereby the latter is driven with a speed which may be varied at will by selectively coupling one of the gears $12^f$ with shaft $12^b$. The tool moving gear 6, 8, 9, and 10 revolves together with the turning ring 2 upon which it is mounted and imparts to the tool carrier $5^a$ cross movement with a speed proportional to the relative speed of the rings 2 and 11. If the gear 12 is adjusted to drive the rings with different velocities, a relative displacement of the rings takes place, so that the tools are moved crosswise in dependence upon said relative displacement, while the tools do not advance when both rings 2 and 11 rotate with equal velocities.

For automatically stopping the cross movement, after a desired diameter of the work piece has been attained, an abutment 13 is opposed to each of the tool holders 4, 4', which abutment is fixed at any desired point on the turning ring on an axially movable rod 14 shiftably supported in studs 14' attached on the supports 4, 4'. This rod 14 is connected with a fork 30 engaging a circumferential groove 31 of a clutch member 7 which is shiftably keyed to spindle 6. Another clutch member is attached to the worm wheel 8 to transmit the rotation of the latter to spindle 6 when the abutment 13 is pushed by the opposed tool holder it throws out of engagement the clutch 7, so that the worm drive 8, 9 runs idle and the spindle 6 discontinues its rotation and the advance of the tool.

For the purpose of enabling the tools to be moved by hand, after the said automatic stopping has come into action, the speed changing gear 12 is set in a manner to give the rings 2, 3 and 11 a ratio of 1:1, so that no cross movement of the tools is produced by this gear. Then the clutch 7 is to be put again into action; for this purpose rod 14 controlling the clutch is provided with a push rod 15, which is adapted to engage, in the course of its revolution with ring 2, a swingable abutment 16, arranged on the machine frame and adapted to be brought in or out of its operative position, as desired. When during the revolution of the ring 2 the said rod 15 abuts against said abutment 16 it is axially displaced so as to put the clutch 7 into action.

The possibility of such axial displacement of rod 14, in spite of its being held by the abutting face of the tool support 4, is provided for by a yieldingly arranged abutment plate 17 connected with abutment 13 by means of a spring. When the engagement of the rod 15 with abutment 16 occurs, the spring is compressed and is kept in this condition owing to friction provided for between plate 17 and rod 14.

For producing the movement by hand, a planetary gear is interposed between the secondary shaft $12^b$ and the gear $12^d$, the main wheels 18, 19 of the said planetary gear being in engagement with the said parts $12^b$ and $12^d$ respectively, and the planet wheels 20 being supported in a rotary part 21, which by a toothed wheel 22 and hand wheel 23 can be rotated round the main axis of the planetary gear. The action is, that by a rotation of the rotary part 21 the planet wheels 20 roll on the first main wheel 18 and thereby impart an additional movement to the second main wheel 19 and to the auxiliary ring 11, thus producing a cross movement of the tools. For indicating the amount of feed imposed on the tool by this hand movement, the wheel 23 is provided with a scale and a reference band 24.

According to Figs. 3 and 4 a special arrangement of the auxiliary ring is provided for the purpose of reducing the friction and enabling the new device to be applied to existing machines.

The turning ring with its driving gear and also the auxiliary ring are essentially the same as in the first constructional form and designated by the same reference numerals. The auxiliary ring 11 is supported by several supporting rollers 24', contacting its inner circumference, and further several guide rollers 25 are so arranged, that by lateral flanges they hold the auxiliary ring 11 against lateral displacement. The guide rollers act simultaneously as supporting rollers. They may be provided preferably in a smaller number than the supporting rollers 24', for instance three to four guiding rollers and a double number of supporting rollers are adapted to hold the auxiliary ring for an easy movement without jamming.

The rollers are arranged on eccentrics 26 which in their turn are held on the machine frame by bolts 27, shown in the drawings as strong screws with slotted heads. By fastening the eccentrics 26 in different positions every roller can be applied to the ring 11 in such way, that the latter runs precisely coaxially with the turning ring and is secured against being deformed.

The eccentrics are provided with small front flanges for preventing axial displacement of the rollers. Many alterations may be provided, as for instance the bolts may be constructed as screws rigidly inserted into the machine frame and provided with nuts. The eccentrics may contain holes for the insertion of a key allowing of simply adjusting them.

I claim:

1. A crank pin lathe, comprising in combination an annular machine frame, a turning ring rotatably held on said frame, an auxiliary ring rotatably held on said frame, a tool moving gear arranged on said turning ring and adapted to be driven by said auxiliary ring, and a speed changing gear fastened to said frame and connecting said rings to each other so as to enable them to rotate with equal and different velocities.

2. A crank pin lathe, comprising in combination an annular machine frame, a turning ring rotatably held on said frame, an auxiliary ring rotatably held on said frame, a tool moving gear arranged on said turning ring and adapted to be driven by said auxiliary ring, a speed changing gear fastened to said frame and connecting said rings to each other so as to enable them to rotate with equal and different velocities, and an intermediate gear interposed between said speed changing gear and any of said rings and provided with hand driven means for producing additional angular displacements of said rings against each other.

3. A crank pin lathe, comprising in combination an annular machine frame, a turning ring rotatably held on said frame, an auxiliary ring rotatably held on said frame, a toothed rim on said auxiliary ring, a tool moving gear arranged on said turning ring, a driving pinion for said tool moving gear in engagement with said toothed rim, a speed changing gear fastened to said frame and connected to said turning ring, and a pinion driven by said speed changing gear and in engagement in said same toothed rim in a plane apart from said driving pinion.

4. A crank pin lathe, comprising in combination an annular machine frame, a turning ring rotatably held on said frame, an auxiliary ring, rollers rotatably held on said frame so as to rotatably support said auxiliary ring, a tool moving gear arranged on said turning ring and adapted to be driven by said auxiliary ring, and a speed changing gear fastened to said frame and connecting said rings to each other so as to enable them to rotate with equal and different velocities.

5. A crank pin lathe, comprising in combination an annular machine frame, a turning ring rotatably held on said frame, an auxiliary ring, rollers rotatably held on said frame so as to rotatably support said auxiliary ring, further rollers with flanges adapted to hold said auxiliary ring against lateral displacement, a tool moving gear arranged on said turning ring and adapted to be driven by said auxiliary ring, and a speed changing gear fastened to said frame and connecting said rings to each other so as to enable them to rotate with equal and different velocities.

6. A crank pin lathe, comprising in combination an annular machine frame, a turning ring rotatably held on said frame, an auxiliary ring, eccentrics turnably held on said machine frame, rollers rotatably arranged on said eccentric so as to adjustably and rotatably support said auxiliary ring, a tool moving gear arranged on said turning ring and adapted to be driven by said auxiliary ring, and a speed changing gear fastened to said frame and connecting said rings to each other so as to enable them to rotate with equal and different velocities.

7. A crank pin lathe, comprising in combination an annular machine frame, a turning ring rotatably held on said frame, rollers rotatably held on said frame, an auxiliary ring rotatably supported with one of its peripheries on said rollers, a toothed rim on the other periphery of said auxiliary ring, a tool moving gear arranged on said turning ring, a driving pinion for said tool moving gear in engagement with said toothed rim, a speed changing gear fastened to said frame and connected to said turning ring, and a pinion driven by said speed changing gear and in engagement in said same toothed rim in a plane apart from said driving pinion.

8. In a crank pin lathe, the combination comprising a stationary annular frame provided with two separate concentric bearing surfaces, a turning ring rotatably mounted on one of said surfaces, an auxiliary ring mounted on the other one of said surfaces, a tool moving gear mounted on said turning ring in operative engagement with said auxiliary ring to be driven with a speed proportional to the relative movement of said rings, and a stationary variable speed driving mechanism connected with said auxiliary ring, whereby said relative movement may be varied at will.

9. In a crank pin lathe, the combination comprising a stationary annular frame provided with two separate concentric bearing surfaces, a turning ring rotatably mounted on one of said surfaces, an auxiliary ring mounted on the other one of said surfaces, a tool moving gear mounted on the lateral face of said turning ring in operative engagement with said auxiliary ring to be driven with a speed proportional to the relative movement of said rings, and a stationary variable speed driving mechanism connected with said auxiliary ring, whereby said relative movement may be varied at will.

10. In a crank pin lathe, the combination comprising a stationary annular frame, a turning ring rotatably held on said frame, an auxiliary rotatable ring arranged concentrically with said turning ring, a driving mechanism capable of being driven with variable speeds and engaging said auxiliary ring, a tool support mounted on said turning ring to be movable in radial direction, a gear arranged on said turning ring in engagement with said auxiliary gear, and a clutch adapted to couple said gear with said tool support whereby the latter is advanced with a speed proportional to the difference in speed between said turning ring and said auxiliary ring so long as said clutch is in active condition.

11. In a crank pin lathe, the combination comprising a stationary annular frame, a turning ring rotatably held on said frame, an auxiliary rotatable ring arranged concentrically with said turning ring, a driving mechanism capable of being driven with variable speeds and engaging said auxiliary ring, a tool support mounted on said turning ring to be movable in radial direction, a tool moving gear in cooperative connection with said support and in engagement with said auxiliary ring, whereby the tool support is advanced with a speed proportional to the difference in speed between said turning ring and said auxiliary ring, a clutch inserted in said tool moving gear, a movable member adapted to disengage said clutch and arranged in cooperative relation to said support to be moved into its disengaging position by the same when the support reaches a predetermined position.

In witness whereof I affix my signature.

A. DORIN.